(12) United States Patent
Pedone

(10) Patent No.: US 7,231,368 B2
(45) Date of Patent: Jun. 12, 2007

(54) E-TICKET VALIDATION PROTOCOL

(75) Inventor: Fernando Pedone, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1137 days.

(21) Appl. No.: 09/839,664

(22) Filed: Apr. 19, 2001

(65) Prior Publication Data

US 2002/0156675 A1    Oct. 24, 2002

(51) Int. Cl.
  *G06Q 99/00*    (2006.01)
(52) U.S. Cl. .............................. 705/44; 705/39; 705/1
(58) Field of Classification Search ................ 705/44, 705/39, 1

See application file for complete search history.

(56) References Cited

U.S. PATENT DOCUMENTS

| | | | |
|---|---|---|---|
| 5,781,910 A | | 7/1998 | Gostanian et al. .......... 707/201 |
| 5,878,139 A | * | 3/1999 | Rosen .......................... 705/75 |
| 6,112,181 A | * | 8/2000 | Shear et al. ................... 705/1 |

FOREIGN PATENT DOCUMENTS

| EP | 0758114 | 2/1997 |
|---|---|---|

OTHER PUBLICATIONS

"Rockwell's E-Mail", Jul. 1999, Computer Telephony, 7, n. 7, p. 40.*

Fernando Perdone—"A Two-Phase Highly-Available Protocol for Online Validation of E-Tickets"—HPL Technical Report #HPL-2000-116—Sep. 12, 2000—pp. 1-18.
Internet Archive Wayback Machine Search—Search Results Jan. 1, 2006—Nov. 3, 2003.
Internet Archive Wayback Machine Search—"A Two-Phase Highly-Available Protocol for Online Validation E-Tickets" Abstract from HPL Technical Reports #HPL-2000-116— Nov. 3, 2003.
Wesley W Chu et al—"The Exclusive-Writer Approach to Updating Replicated Files in Distributed Processing Systems" -IEEE Transactions on Computers vol. C-34 No. 6 Jun. 1, 1985 pp. 489-500.
Perry R James et al—"Development of an Atomic-Broadcast Protocol Usong LOTOS"—Software Practice and Experience—John Wiley & Sons Ltd. vol. 29 No. 8 Jul. 10, 1999 pp. 699-719.
Kazuo Matsuyama—"Distributed Digital-Ticket Management for Rights Trading System" Proceedings ACM Conference on Electronic Commerce—1999 —pp. 110-118.

* cited by examiner

*Primary Examiner*—Akiba Robinson-Boyce

(57) ABSTRACT

A method of validating an e-ticket includes the step of sending the e-ticket from an initial receiving server $S_i$ to a plurality of servers including $S_j$. Each server returns an answer indicative of whether that server previously answered an inquiry for the e-ticket. A conflict mode of validation is selected if at least one selected server of a majority of servers answered a previous inquiry for the e-ticket. A conflict-free mode of validation is selected if none of the majority of servers has answered any previous inquiry for the e-ticket.

16 Claims, 7 Drawing Sheets

1: 'INITIALIZATION
2: $rTKT_i \leftarrow \emptyset$
3: $vTKT_i \leftarrow \emptyset$
4: $aTKT_i \leftarrow \emptyset$
5: 'IDENTIFY MODE; HANDLE IF CONFLICT-FREE MODE
6: WHEN RECEIVE $\tau$ FROM USER
7: IF $\tau \in rTKT_i$ THEN
8:     REJECT($\tau$)
9: ELSE
10:     $rTKT_i \leftarrow rTKT_i \cup \{\tau\}$
11:     $REPLIES_i^\tau \leftarrow \emptyset$
12:     SEND($S_i$, $\tau$, NEWTKT) TO ALL
13: WHEN RECEIVE ($S_j$, $\tau_j$, NEWTKT) FROM $S_j$
14:     IF $\left(\exists\ S_k \ni (S_k, \tau_j) \in aTKT_i\right)$ THEN
15:         SEND($S_k$, $\tau_j$, NACK) TO $S_j$
16:     ELSE
17:         $aTKT_i \leftarrow aTKT_i \cup \{(S_j, \tau_j)\}$
18.         SEND($S_j$, $\tau_j$, ACK) TO $S_j$
19: WHEN (RECEIVE($S_j$, $\tau_j$, ACK) OR ($S_j$, $\tau_j$, NACK) FROM $S_k$) AND ($\tau_j \notin vTKT_i$) THEN
20:     $REPLIES_i^{\tau_j} \leftarrow REPLIES_i^{\tau_j} \cup \{S_j\}$
21:     IF COUNT($REPLIES_i^{\tau_j}$) $\geq \lceil (N+1)/2 \rceil$ THEN
22:         IF (RECEIVED(*, $\tau_j$, ACK) $\forall S_k \in REPLIES_i^{\tau_j}$ THEN
23:             ACCEPT($\tau_j$)
24:         ELSE
25: 'CONFLICT MODE
26:         $SRVS_i^{\tau_j} \leftarrow \emptyset$
27:         BROADCAST($S_i$, $\tau_j$, $REPLIES_i^{\tau_j}$)
28:         REPEAT
29:             WAIT UNTIL DELIVER($S_j$, $\tau_j$, $REPLIES_j^{\tau_j}$)
30:             $SRVS_i^{\tau_j} \leftarrow SRVS_i^{\tau_j} \cup \{S_j\}$
31         UNTIL ($j = i$ OR $\exists S_k \in SRVS_i^{\tau_j} \ni REPLIES_k^{\tau_j} \subseteq SRVS_i^{\tau_j}$)
32:         IF (DELIVERED(($S_i$, $\tau_j$, $REPLIES_i^{\tau_j}$)) AND $REPLIES_i^{\tau_j} \subseteq SRVS_i^{\tau_j}$ THEN
33:             ACCEPT($\tau_j$)
34:         ELSE
35:             REJECT($\tau_j$)
36:         $vTKT_i \leftarrow vTKT_i \cup \{\tau_j\}$

FIG. 8

E-TICKET VALIDATION PROTOCOL

FIELD OF THE INVENTION

This invention relates to the field of transactional security in an electronic commerce environment. In particular, this invention is drawn to e-ticket validation.

BACKGROUND OF THE INVENTION

The advent of Internet commerce has increased the prevalence of e-tickets. E-tickets permit consumers to reserve goods and services in advance of the consumption of those goods or services. During an Internet session, for example, a user may visit a web site to make travel arrangements including flight and car reservations. The user is provided with a unique confirmation key or e-ticket for the reserved goods or services. Subsequently, the user must present the e-ticket in order to utilize or obtain the reserved services or goods. A validation protocol is used to determine whether the submitted e-ticket is valid based on a number of requirements. Once the e-ticket is determined to be valid, the e-ticket can be accepted so that the goods or services may be provided to the user.

Typically, the e-ticket is only valid for a single use. One validation protocol simply assumes that the user will not attempt to use the e-ticket more than once. Such protocols are susceptible to abuse by malicious users. Unlike paper tickets, e-tickets need not be relinquished when submitted. Copies are readily and inexpensively made. Thus a user may intentionally or unintentionally resubmit the same e-ticket or even distribute the e-ticket for submission by others.

Another validation protocol relies on a centralized server to ensure the issuance of unique e-tickets and to ensure that a valid e-ticket is accepted only once. One disadvantage of this approach is that the entire protocol has a single point of failure. If the centralized server crashes, valid e-tickets cannot be accepted. Thus this approach is not sufficiently robust to withstand a failure in the centralized server.

A failure detection mechanism can be introduced to support failovers to backup servers when the centralized server crashes. One disadvantage of this approach is the reliance upon perfect failure detection. Mistakes in failure detection result in unexpected behavior.

The failure detection mechanisms may determine that a server has crashed based on a period of non-responsiveness. The length of time that the failure detection mechanism must wait when determining non-responsiveness necessarily trades off false positive diagnosis for false negative diagnosis at least for a period of time. If the server has crashed, the failure detection mechanism may not indicate such until after the expiration of a pre-determined time period during which a false negative condition is effectively occurring. Similarly, if the server has not crashed but is very busy, the failure detection mechanism may indicate that the server has crashed when in fact the server is simply too busy during the pre-determined time period to respond. Either of these conditions may lead to unexpected or undesired behavior.

For example, multiple acceptance could occur if a backup server takes over when the centralized server was non-responsive due to workload as opposed to an actual crash (i.e., false positive). Alternatively, no acceptance might occur if the backup server fails to take over when the centralized server has crashed (false negative).

SUMMARY OF THE INVENTION

In view of limitations of known systems and methods, a method of validating e-tickets includes the step of sending the e-ticket from an initial receiving server $S_i$ to a plurality of servers including $S_j$. Each server returns an answer indicative of whether that server previously answered any inquiry for the e-ticket. A conflict mode of validation is selected if at least one selected server of a first responding majority of servers answered a previous inquiry for the e-ticket. A conflict-free mode of validation is selected if none of the first responding majority of servers has answered any previous inquiry for the e-ticket.

Another method includes the step of sending the e-ticket from an initial receiving server $S_i$ to a plurality of servers including $S_j$. Each server returns an answer indicative of whether that server previously answered an inquiry for the e-ticket. The identities of the answering servers is collected in an answer set $REPLIES_i^\tau$. The e-ticket and $REPLIES_i^\tau$ are broadcast to the plurality of servers, if at least one server previously answered an inquiry for the e-ticket. The identity of any server $S_k$ broadcasting the e-ticket and an associated answer set $REPLIES_k^\tau$ is collected in a second answer set, $SRVS_i^\tau$ until either $S_i$ delivers its own broadcast or there exists some server $S_k$ in $SRVS_i^\tau$ such that $REPLIES_k^\tau \subseteq SRVS_i^\tau$. The e-ticket is accepted only if $S_i$ delivered its own broadcast and $REPLIES_i^\tau \subseteq SRVS_i^\tau$.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 8 illustrates a pseudo-code representation of the validation protocol executed by a validation server.

DETAILED DESCRIPTION

Figure 1:
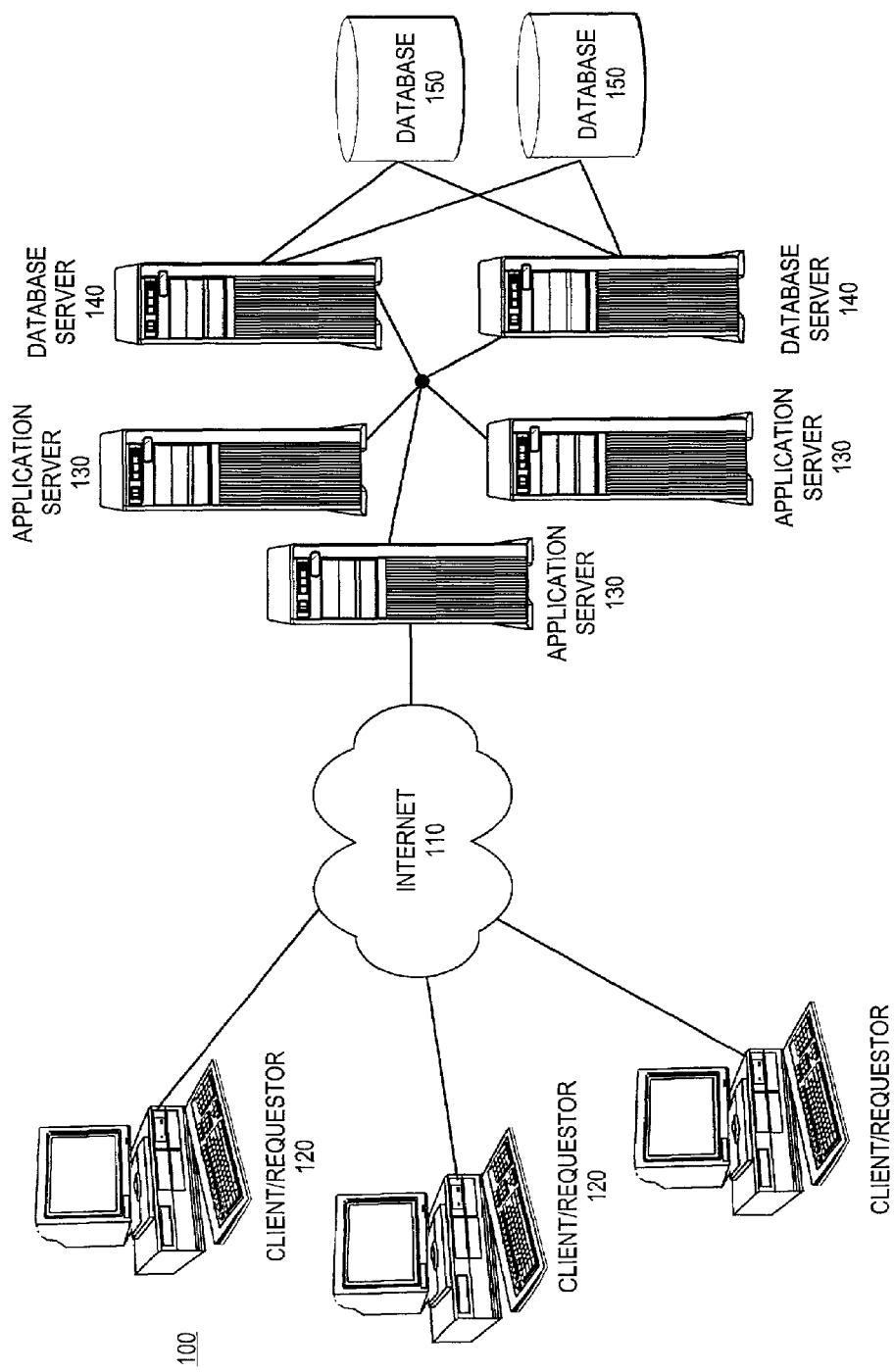
FIG. 1 illustrates one embodiment of a transaction processing environment for processing e-tickets.

FIG. 1 illustrates one embodiment of a transaction processing model for issuing or validating e-tickets. FIG. 1 illustrates a tiered transaction processing architecture 100. The three tier architecture is a distributed architecture and has become a prevalent architecture in Internet commerce. Client/requestors 120 represent the first or top tier of the architecture. The first tier provides end-users with a front-end interface to the application servers 130. The front-end interface includes the user interface and related services such as session, text input, dialog, and display management. For Internet applications, the front-end interface is typically realized using a software application referred to as a "browser" that is executing on the client machine 120. The browser application provides a graphical user interface that enables the user to navigate to and request different resources accessible through the Internet. Other embodiment of clients may include cellular phones, personal digital assistants (PDAs), or other communication devices that may serve as the client in a client/server architecture.

The second or middle tier represented by application servers 130 provides process management where the business logic is executed. Validation of a client-issued request, for example, is one example of processing handled by the application server. The middle tier also provides functions such as queuing, application execution, and database staging. A communications medium such as the Internet 110 enables client/requestors 120 to issue requests to one or more application servers 130. The application server 130 is typically handling requests from multiple users in an asynchronous manner. The application servers are stateless, but may have side-effects on the databases 150.

The third or bottom tier includes databases 150 and database servers 140 which are collectively referred to as the database servers unless explicitly indicated otherwise. The third tier provides database management services. The application servers 130 execute database queries and updates to databases 150 through database servers 140. After processing a client-issued request, the application server returns the result to the appropriate client/requestor.

E-tickets represent one type of result returned to the client/requestor. For example, a user may have made travel arrangements using client 120. Once availability has been confirmed and payment has been made, the user is provided with an e-ticket. The e-ticket may be submitted at the time the resources or services are consumed. The user may present media storing the e-ticket at the flight gate. If accepted, the passengers that the e-ticket transaction was booked for may board the plane. Other examples for the use of e-tickets include digital cash, electronic payment systems, licenses (i.e., software), travel reservations, public transportation, public performances, or any goods and services that may be purchased or acquired with a money proxy such as a ticket.

E-tickets are generated in response to user submitted requests for goods or services. In one embodiment, the e-ticket is anonymous such that it does not contain any information that identifies its owners. The e-tickets may subsequently be submitted in order to collect the previously reserved goods and services. Acceptance of the e-ticket is determined by a validation protocol.

The e-ticket validation protocol should protect against losses from duplication and should ensure authenticity and integrity. Detecting duplication prevents multiple use of the e-ticket by the same or different users. E-tickets should be accepted only when issued from an authentic source. Authentic e-tickets should be accepted only if they have not been tampered with. Assuming an e-ticket is authentic and has not been tampered with, e-ticket acceptance is dictated by the following constraints:

(E-1) If a server accepts an e-ticket, $\tau$, then no other server accepts $\tau$ and no server adopts the same e-ticket more than once; and (E-2) If $\delta(\tau)$ presents the set of servers that validate the same e-ticket and no server in $\delta(\tau)$ crashes, there is a server in $\delta(\tau)$ that eventually accepts $\tau$.

The first condition ensures acceptance at most once. The second condition is designed to ensure acceptance at least once. Together the constraints are designed to ensure exactly once acceptance in the absence of crashes. If some server in $\delta(\tau)$ crashes, however, there is no guarantee that $\tau$ will be accepted. Therefore in the presence of crashes, E-1 and E-2 can only ensure at most once acceptance.

The following validation protocol is designed to implement exactly once acceptance in the absence of crashes and at most once acceptance in the presence of crashes.

The transaction environment for executing the validation protocol may be modeled as user processes which submit e-tickets to a plurality n of server processes for validation. For example, user $u_i$ submits e-ticket $\tau$ to server $S_i$ for validation, where $u_i \in \{u_1, u_2, u_3 \ldots u_m\}$ and $S_k \in \{S_1, S_2, \ldots S_n\}$. The users may submit e-tickets to one or more validation servers. Collectively the validation servers may be concurrently validating a plurality of e-tickets.

Referring to FIG. 1, client/requestors 120 correspond to the user processes. In a two tier system, the application/database server tier corresponds to the server processes. The application servers 130 correspond to the server processes in the three tier environment.

The total number of servers does not change during validation of an e-ticket. Although a server may crash during validation, a majority of the n servers is presumed not to have failed. After crashing, a server process does not execute any other event that would affect the validation protocol. Validation servers are presumed not to act maliciously. Users, however, are not trusted to behave in a non-malicious manner. The validation protocol thus does not rely on perfect failure detection or trustworthy users.

The user and server processes are connected through reliable channels. The primitives send and receive describe communication on the channels. If a process sends message m to another process and both sender and receiver do not crash, then m is eventually received. Channel failure is acceptable but presumed to be corrected after some period of time. The retransmission of messages and tracking of duplicate messages may be used to ensure reliability of the channels.

Validation servers may also exchange messages using the primitives broadcast and deliver. "Deliver" refers to the receipt of a message issued with the broadcast primitive as opposed to the send primitive. In one embodiment, the broadcast and deliver primitives conform to an Atomic Broadcast communication protocol.

An Atomic Broadcast protocol is subject to the following constraints. If a validation server broadcasts m and does not crash, then that validation server eventually delivers m (i.e., validity—the validation server receives its own broadcast message). If a validation server delivers the message m, then all validation servers that have not crashed eventually deliver m (i.e., agreement—all working validation servers receive the broadcast message). For every broadcast message m, every server delivers m at most once and only if m was previously broadcast (i.e., uniform integrity). If two validation servers $S_1$ and $S_2$ both deliver messages $m_1$ and $m_2$, then $S_1$ delivers $m_1$ before $m_2$ if and only if $S_2$ delivers $m_1$ before $m_2$ (i.e., total order).

In various embodiments, the Atomic Broadcast may be implemented as a "CT-broadcast" or an "OPT-broadcast". The CT-broadcast first sends broadcast messages to the servers which decide on a common delivery order for the message using a consensus algorithm. The OPT-broadcast makes optimistic assumptions about the system in order to deliver messages faster. For example, the hardware characteristics of the network may be accounted for. An OPT-broadcast identifies whether messages arrive at destinations in a total order instead of first using a consensus algorithm to decide on a common delivery order. If the order is correct, the OPT-broadcast is faster. If, however, the order is not correct, then the CT-broadcast is ultimately faster.

In another embodiment, a General Broadcast is used instead of a pure Atomic Broadcast. A pure Atomic Broadcast orders all messages. The General Broadcast may be used to order all messages related to a specific e-ticket. The General Broadcast is in effect an Atomic Broadcast on a local scale (atomic with respect to groups of messages related to the same e-ticket). In one embodiment, before ordering a message m, a server using General Broadcast checks with the other servers to see if there are messages with which m has to be ordered. If not, m can be delivered without the cost of a consensus execution.

The validation protocol validates e-tickets using one of two modes. A conflict-free mode is used to address the typical case where e-tickets are submitted only once. A conflict mode handles cases where the e-tickets are submitted more than once. Although all e-tickets may be validated using the conflict mode, the bifurcated approach is more efficient in the absence of malicious users. In particular, non-malicious users will generally have the benefit of the faster conflict-free mode.

Figure 2:
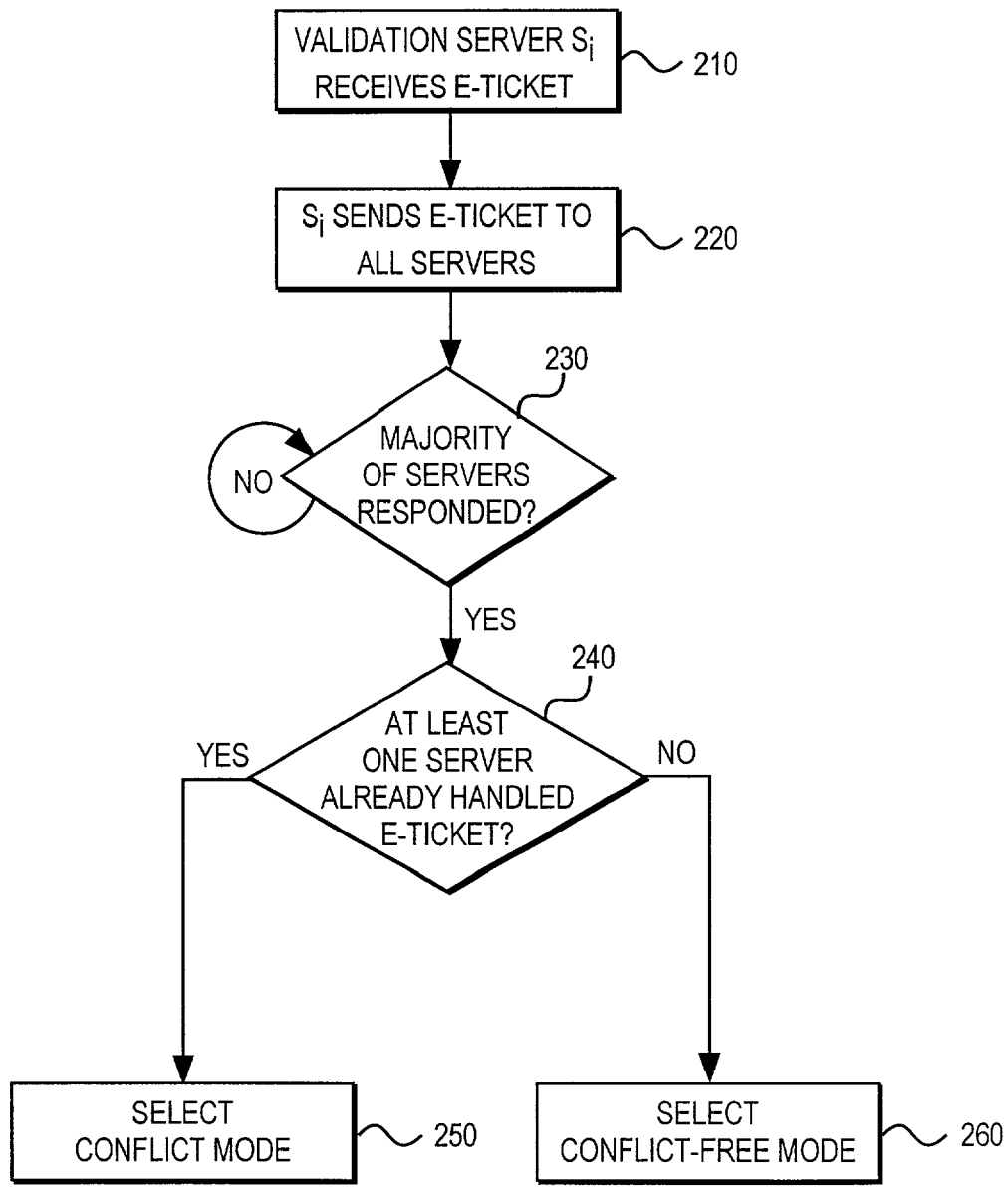
FIG. 2 illustrates a bifurcated method for validating e-tickets.

FIG. 2 illustrates the beginning of the validation protocol. In step 210, a validation server, $S_i$, receives an e-ticket from a user for validation. In step 220, $S_i$ sends the e-ticket to all of the servers (including itself) as an inquiry. In step 230, $S_i$ waits until a majority of the servers has answered the inquiry. In one embodiment, a server sends an acknowledgment (ACK) if that server has not previously responded to a server inquiry regarding that e-ticket. Otherwise the server sends an affirmative non-acknowledgment (NACK) to indicate that it has previously responded to a server inquiry regarding the e-ticket. Once a majority of the servers has responded, $S_i$ analyzes the responses.

Step 240 determines if at least one of the responding servers has already handled the e-ticket (i.e., at least one server sends a NACK). If so, then the conflict mode validation approach is selected in step 250. Otherwise, the conflict-free mode is selected in step 260.

The conflict-free mode is straightforward. $S_i$ accepts the e-ticket in the conflict-free mode. The conflict mode, however, must handle two cases. If every server that validates the e-ticket proceeds to conflict mode such that no server accepts the e-ticket in conflict-free mode and does not crash, then some server must accept the e-ticket in conflict mode. Conversely, if some server accepts the e-ticket in conflict-free mode, every server executing conflict mode rejects the e-ticket. The conflict mode may be encountered if the e-ticket is being validated by more than one server at the same time. This could occur, for example, if the e-ticket was submitted to multiple servers before any server had accepted or rejected the e-ticket.

Figure 3:
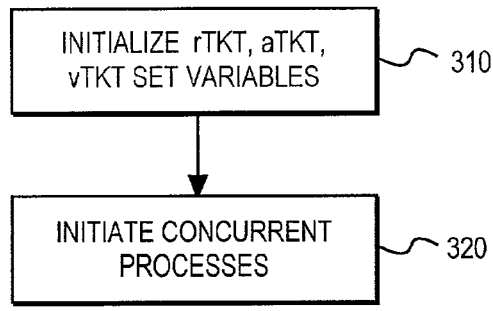
FIG. 3 illustrates initialization of the validation protocol.

FIGS. 3-7 illustrate the validation protocol in greater detail. FIG. 3 illustrates initialization of the validation protocol process on a server, $S_i$. Step 310 initializes $S_i$'s set variables $rTKT_i$, $vTKT_i$, and $aTKT_i$ to null. $rTKT_i$ is used to track all e-tickets received by $S_i$ from a user as opposed to e-tickets communicated to $S_i$ from servers during the validation process. $vTKT_i$ is used to track all e-tickets received by $S_i$ from a user for which $S_i$ is making an affirmative accept or reject decision for the first time. $aTKT_i$ is used to track every e-ticket validation inquiry that $S_i$ receives from the plurality of servers. Step 320 launches the concurrent processes of the validation protocol process.

Figure 4:
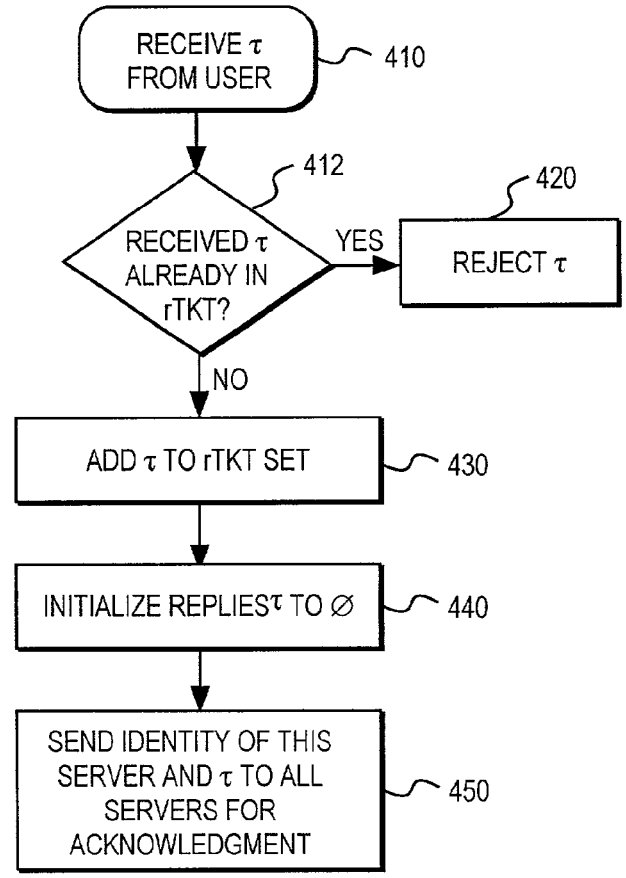
FIG. 4 illustrates the validation protocol's response to receipt of an e-ticket from a user.

FIG. 4 illustrates the task of handling e-tickets submitted by the user. The process is invoked in step 410 upon receipt of an e-ticket, $\tau$, from a user. If any user has previously submitted $\tau$ to this server as determined by step 412, the e-ticket is rejected in step 420 and this task is finished.

If no user has previously submitted $\tau$ to this server, the e-ticket is added to this server's list of received e-tickets in step 430. A variable for tracking answers from other servers with respect to $\tau$ is initialized in step 440. In particular, $REPLIES_i^\tau$ is set to null. $S_i$ sends an inquiry to all validation servers in step 450 after which the task is finished. The inquiry identifies the sending server and the e-ticket to all servers for acknowledgment.

Figure 5:
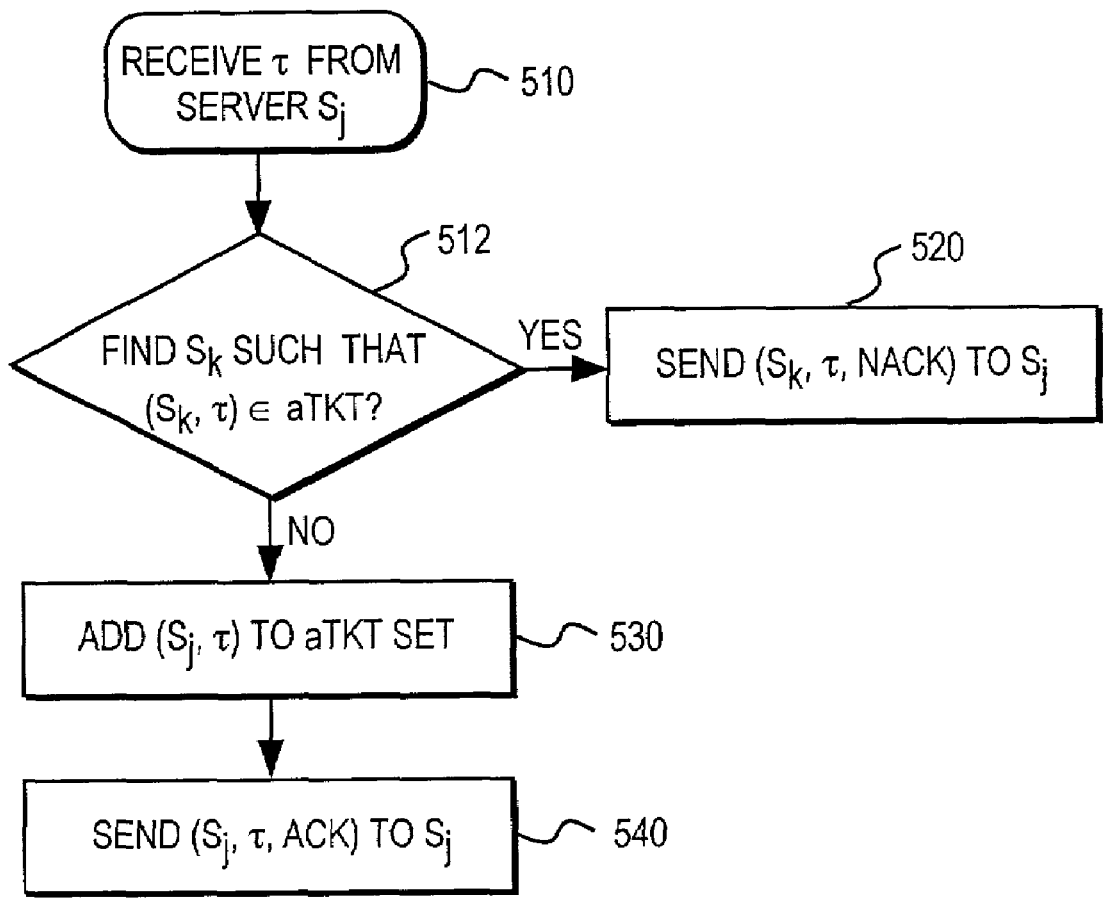
FIG. 5 illustrates the validation protocol's response to an e-ticket inquiry from a server.

FIG. 5 illustrates the second task which answers inquiries about e-tickets from servers. This task is invoked whenever the current server receives an e-ticket inquiry from one of the plurality of servers ($S_j$) in step 510. Step 512 determines whether $S_i$ has responded to a prior inquiry about the e-ticket from any server ($S_k$). If so, $S_i$ provides an answer by sending a NACK, the e-ticket, and the identity of the server making the first inquiry, $S_k$, to $S_j$ in step 520. A NACK answer indicates a conflict.

If $S_i$ has not previously responded to an inquiry about this e-ticket, then the e-ticket and the identity of the inquiring server ($S_j$) are added to the set of acknowledged e-tickets ($aTKT_i$) in step 530. $S_i$ then provides an answer by sending an ACK, the e-ticket, and the identity of the inquiring server $S_j$ to the inquiring server in step 540. The ACK answer conveys a vote for accepting the e-ticket to the receiving server but is not a sufficient condition for accepting the e-ticket.

Figure 6:
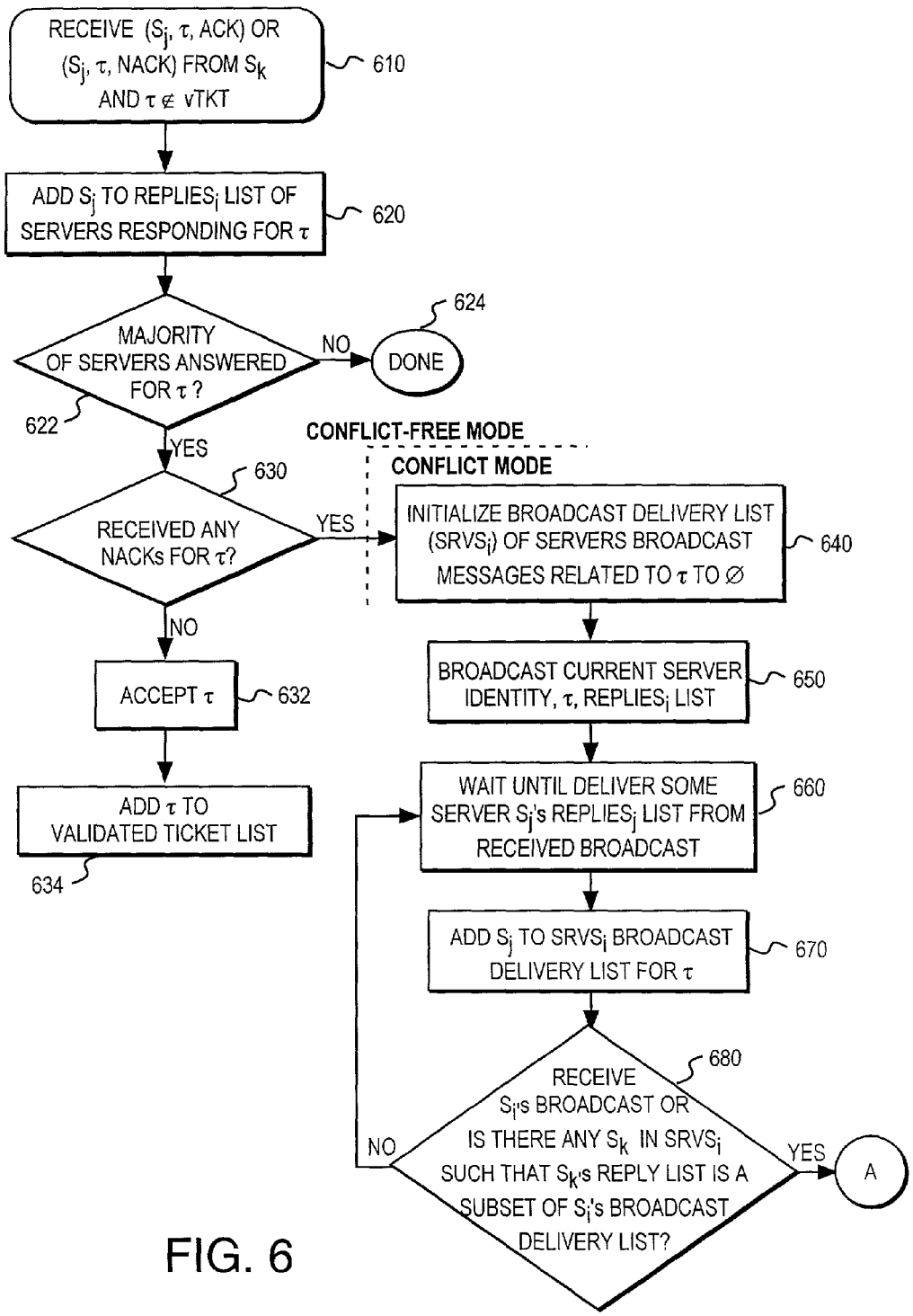
FIG. 6 illustrates the validation protocol's processing of an answer to an e-ticket inquiry.
Figure 7:
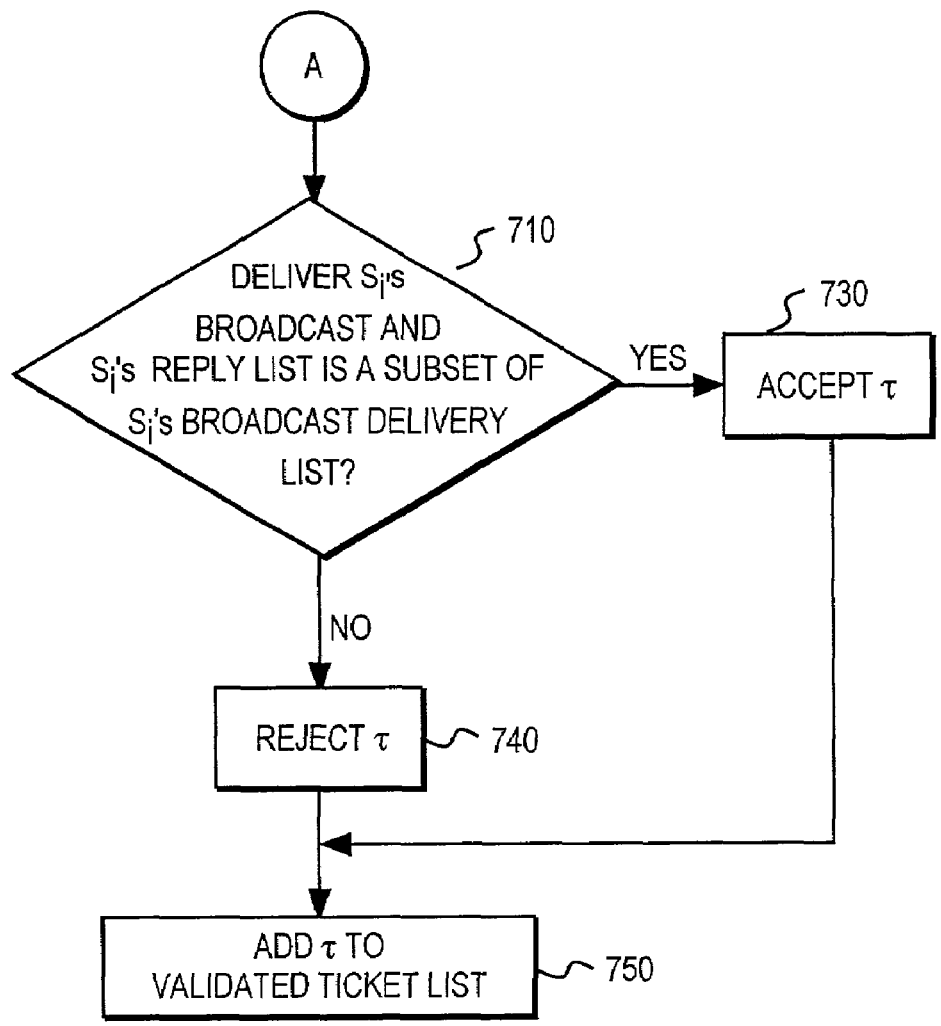
FIG. 7 illustrates the validation protocol's processing of an answer to an e-ticket inquiry.

The third task accepts or rejects e-tickets received from a user for the first time by $S_i$ based on answers received from a majority of the servers (including $S_i$). If there is no conflict, the e-ticket may be accepted. If there is a conflict, however, the e-ticket cannot be rejected outright. Additional processing is performed to ensure that the e-ticket is accepted at most once even if servers crash and exactly once if no servers crash. FIGS. 6-7 address this task in detail.

The third task is invoked in step 610 when an ACK or NACK is provided by a server $S_j$ as an answer to an inquiry posed by $S_i$ for a given e-ticket and the e-ticket is not already on $S_i$'s validated e-ticket list in which case, $S_i$ has already decided whether to accept or reject the e-ticket and the message just received from $S_j$ can be discarded. The identity of the answering server is added to the list of replying servers ($REPLIES_i^\tau$) for the specified e-ticket in step 620. $REPLIES_i^\tau$ referred to as the send answer list in order to distinguish it from a broadcast delivery list.

Step 622 determines whether a majority of servers have answered the inquiry regarding $\tau$. If a majority of servers has not yet responded, the third task does not further proceed as indicated by step 624. The third task will be re-invoked each time the conditions of step 610 are true until answers have been collected from a majority of servers. Responses from more servers than necessary for a majority may be collected. Answers are considered in the order received, however, until a majority of servers have responded. Thus only the answers from the "first responding majority" of servers is considered. Once a majority of servers have responded, the answers of any subsequently responding server is effectively ignored.

Once answers have been collected from a majority of servers, step 630 determines whether any of the answers includes a NACK for the e-ticket. If no NACKs have been received, the e-ticket is accepted in step 632.

The effect of accepting will necessarily be defined by the system implementing the protocol. In one embodiment, acceptance results in notification to the user and a release of the resources to the user. In an alternative embodiment, acceptance results in generation of a proof of acceptance that the user may utilize to effect a release of the reserved resources.

Once accepted, the e-ticket is added to the validated list for $S_i$ in step 634. The validation process is thus completed with respect to the initial submission of e-ticket $\tau$ to this server.

Receipt of a NACK does not imply that the current server must reject the submitted e-ticket. If no server has crashed and no server has accepted the e-ticket in conflict-free mode, then some server must accept the e-ticket in conflict mode. Alternatively, if some server has accepted the e-ticket in conflict-free mode, then no server can accept the e-ticket in conflict mode. If multiple users submit the same e-ticket or if one user submits the same e-ticket to more than one server before a decision to accept or reject has been decided on the initial submission, some server will answer ACK and some will answer NACK even though no server has accepted the e-ticket. Conflict mode ensures that at least one server will accept the e-ticket despite a NACK if no servers have crashed and no server has previously accepted the e-ticket in conflict-free mode.

Conflict mode begins with initializing this server's broadcast delivery list for e-ticket $\tau$ in step 640 (i.e., $SRVS_i^\tau \leftarrow \emptyset$). The current server broadcasts its identity, $\tau$, and $S_i$'s send answer list to all servers in step 650. $S_i$ then waits until delivery of a broadcast from any server $S_j$ as indicated in step 660.

Upon delivery of a message broadcast by server $S_j$, the current server adds $S_j$ to $S_i$'s broadcast delivery list for $\tau$ ($SRVS_i^\tau$) in step 670. The delivered message includes the broadcasting server's send answer list (i.e., $REPLIES_j^\tau$) formed from the list of servers answering a send inquiry for $\tau$. Step 680 then determines whether the current server either 1) received its own broadcast message, or 2) whether the current server has delivered a send answer list from some server $S_k$ in the current server's broadcast delivery list for $\tau$ such that every server listed in $S_k$'s send answer list (i.e., $REPLIES_k^\tau$) is also present in this server's broadcast delivery list for $\tau$ (i.e., $SRVS_i^\tau$). The second condition is true if $REPLIES_k^\tau$ is a subset of $SRVS_i^\tau$ (i.e., $REPLIES_k^\tau \subseteq SRVS_i^\tau$). Steps 660-680 are thus repeated until either $S_i$ delivers its own broadcast or there exists some server $S_k$ in $SRVS_i^\tau$ such that $REPLIES_k^\tau \subseteq SRVS_i^\tau$ after which processing continues with step 710 of FIG. 7.

Step 710 determines whether both conditions of step 680 are true. If so, the e-ticket is accepted in step 730, otherwise the e-ticket is rejected in step 740. E-ticket $\tau$ is then added to this server's validated ticket list in step 750 to indicate that this server has made an affirmative accept or reject decision based on the initial submission of $\tau$ to this server.

FIG. 8 illustrates a pseudo-code representation of the server validation protocol. A number of variables have been provided with subscripts to enable distinguishing them clearly from similarly named variables communicated from other servers.

The set variables corresponding to the received ($rTKT_i$), validated ($vTKT_i$), and acknowledged ($aTKT_i$) e-tickets are initialized to the empty set ($\emptyset$) in lines 2, 3, and 4, respectively. $rTKT_i$ is used to track all e-tickets received by $S_i$ from a user as opposed to e-tickets communicated to $S_i$ from validation servers during the validation process. $vTKT_i$ is used to track all e-tickets for which $S_i$ is making an affirmative accept or reject decision for the first time. $aTKT_i$ is used to track every e-ticket validation inquiry that $S_i$ receives from servers. Other set variables to be introduced include $REPLIES_i^\tau$ which tracks the identity of servers responding to a sent inquiry about $\tau$ and $SRVS_i^\tau$ which tracks the identity of servers broadcasting an inquiry about $\tau$.

Lines 5-24 identify the mode and handle processing of the conflict-free mode of the validation protocol. Lines 25-36 address the conflict mode. Subscripts distinguish servers that a variable is associated with. The subscript "i" always refers to this server (e.g., $S_i$). Subscripts other than i are used to associate variables with any server including $S_i$.

The first task of identifying the mode is performed by determining whether this server has previously received the user provided e-ticket, $\tau$. Task one begins with the receipt of $\tau$ from the user (line 6). A determination is made as to whether this server has previously received $\tau$ (line 7). In particular, the current server's set of received e-tickets is examined to see if the received e-ticket is a member. If so, then $\tau$ is rejected (line 8). If $\tau$ has not previously been received by $S_i$, a check must be performed to determine whether any other server has already handled $\tau$.

First, $\tau$ is added to the received list of the current server (line 10). This ensures that $\tau$ will be rejected immediately upon subsequent encounters if re-submitted from a user to the current server. Next a reply list ($REPLIES_i^\tau$) is introduced and initialized for tracking the identity of servers responding to inquiries about $\tau$ (line 11). Finally, the identity of the current server ($S_i$) is sent along with the received e-ticket ($\tau$) and an inquiry tag (NEWTKT) to all the other servers (line 12).

The second task is to respond to validation inquiries from validation servers in regards to a given e-ticket. Thus task two begins in response to an inquiry (NEWTKT) from any server, $S_j$, about whether a given e-ticket, $\tau_j$, should be accepted or rejected (line 13).

If the present server, $S_i$, has previously received an inquiry regarding $\tau_j$ from any server, $S_k$, (line 14) as determined by scanning the list of acknowledged e-tickets ($aTKT_i$), then $S_i$ notifies $S_j$. In particular, $S_i$ sends the identity of this other server $S_k$, the identity of the e-ticket, and a NACK tag to $S_j$ in line 15. The NACK response is provided by the current server to indicate to the inquiring server that the e-ticket should be rejected.

If the present server has not received prior inquiries regarding $\tau_j$, the identity of the inquiring server, $S_j$, and $\tau_j$ are recorded in the acknowledged list ($aTKT_i$) before responding. An ACK and $\tau_j$ are sent to $S_j$ (lines 17-18).

The third task is to gather and act on answers received from the group of servers about a given e-ticket, $\tau_j$. Answers are distinguished from other inquiries by the receipt of an ACK or NACK tag instead of a NEWTKT tag. Lines 20-36 are pre-conditioned upon the receipt of an answer regarding an e-ticket that has not already been validated. The identity of the answering server $S_j$ is added to the replies set ($REPLIES_i^\tau$). No further processing aside from collecting the identity of answering servers with respect to $\tau_j$ will take place until a majority of the servers have replied with ACK or NACK.

Once NACK or ACK answers for $\tau_j$ have been received from a majority of the servers, line 22 determines whether each server of this group answered with ACK for $\tau_j$. If so (i.e., all servers answered with ACK), then $S_i$ is free to accept e-ticket $\tau_j$ (line 23).

If on the other hand there is at least one NACK, additional testing must be performed. A $SRVS_i^\tau$ variable is introduced and initialized for tracking all servers from which the current server has delivered a message regarding a given e-ticket, $\tau$ (line 26). Broadcast mode is distinguished from normal send mode by the constraints of the Atomic Broadcast protocol which preserves total order. Server $S_i$ broadcasts its own identity, e-ticket $\tau_j$, and the list of servers known to have replied for $\tau_j$ out to all validation servers (line 27).

The current server, $S_i$, then iteratively collects broadcast messages related to $\tau_j$ in lines 28-31. Each time a broadcast is received from some server $S_j$ regarding $\tau_j$ the identity of that server is added to the set $SRVS_i^{\tau_j}$. The process of waiting until broadcasts are received and adding the identity of the broadcasting server to the list continues until either server $S_i$ 1) receives the message it broadcast, or 2) there is some server $S_k$ in $SRVS_i^{\tau_j}$ such that $REPLIES_i^{\tau_j} \subseteq SRVS_i^{\tau_j}$. If either of these conditions are met $S_i$ need not deliver any more broadcasts for $\tau_j$.

Once the appropriate broadcast message has been delivered, $S_i$ can make an accept or reject decision. In particular $S_i$ will accept e-ticket $\tau_j$, if 1) $S_i$ has already delivered the message it broadcast, and 2) every server listed in the send answer list is in the broadcast delivery list. If these latter conditions prevail, the e-ticket will be accepted (lines 32-33), otherwise it will be rejected (lines 34-35). The first time the e-ticket is affirmatively accepted or rejected by $S_i$ the e-ticket is added to the set of $S_i$'s validated tickets (i.e., $vTKT_i$ in line 36).

A validation protocol providing exactly once acceptance in the absence of crashes and at most once acceptance in the presence of crashes has been described. To validate an e-ticket $\tau$ sent by some user, server $S_i$ sends message $(S_i, \tau, NEWTKT)$ to all servers. When server $S_i$ receives a message $(S_j, \tau, NEWTKT)$ from any server $S_j$, server $S_i$ sends $(S_k, \tau, NACK)$ to $S_j$, if $S_i$ has previously received some message of the type $(S_k, \tau, NEWTKT)$. If no such message was previously received by $S_i$, then $S_i$ sends $(S_j, \tau, ACK)$ to $S_j$. Upon receiving an answer to an inquiry for $\tau$, $S_i$ updates set $REPLIES_i^\tau$ which stores the identity of every server $S_k$ contained in any reply message received by $S_i$ for $\tau$. $S_i$ waits for replies from a majority of the servers (i.e., $\lceil (n+1)/2 \rceil$ replies). If all messages received by $S_i$ are of the type $(S_k, \tau, ACK)$, then $S_i$ accepts $\tau$. Otherwise, if any message is of the type $(S_k, \tau, NACK)$, $S_i$ starts handling the e-ticket in conflict mode.

In conflict mode, $S_i$ broadcasts message $(S_i, \tau, REPLIES_i^\tau)$ and waits for the delivery of any message of the type $(*, \tau, REPLIES_*^\tau)$. $S_i$ stores the identity of the servers whose messages it has delivered in $SRVS_i^\tau$ and continues the process of collecting deliveries and corresponding send answer lists until it either a) delivers its own broadcast message, or b) it delivers a message from some server such that there exists a server $S_k$ in $SRVS_i^\tau$ with a corresponding send answer list $REPLIES_k^\tau$ such that $REPLIES_k^\tau \subseteq SRVS_i^\tau$. Server $S_i$ can accept $\tau$ only if it delivers the message it broadcast such that $REPLIES_i^\tau \subseteq SRVS_i^\tau$. The validated e-tickets are stored so that they are not accepted again.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of evaluating an e-ticket, comprising the steps of:
   a) sending the e-ticket from an initial receiving server $S_i$ to a plurality of servers including $S_i$, wherein each server returns an answer indicative of whether that server previously answered an inquiry for the e-ticket;
   b) collecting the identities of the answering servers in an answer set;
   c) broadcasting the e-ticket and the answer set to the plurality of servers, when one server previously answered an inquiry for the e-ticket;
   d) collecting the identity of any server $S_k$ broadcasting the e-ticket and an associated answer set in a second answer set upon receipt of the broadcast; and
   e) rejecting the e-ticket if the answer set is a subset of the second answer set, wherein steps a), b), c), d), and e) are performed to evaluate the e-ticket.

2. The method of claim 1 wherein step b) is performed until a majority of servers has answered.

3. The method of claim 1 further comprising the step of:
   e) accepting the e-ticket if $S_i$ receives its own broadcast and the answer set is a subset of the second answer set.

4. The method of claim 1 further comprising the step of:
   rejecting the e-ticket if $S_i$ has received its own broadcast and the answer set is not a subset of the second answer set.

5. A method of evaluating an e-ticket, comprising the steps of:
   a) sending the e-ticket from an initial receiving server $S_i$ to a plurality of servers including $S_i$, wherein each server returns an answer indicative of whether that server previously answered an inquiry for the e-ticket;
   b) collecting the identities of the answering servers in an answer set;
   c) broadcasting the e-ticket and the answer set to the plurality of servers, when one server previously answered an inquiry for the e-ticket;
   d) collecting the identity of any server $S_k$ broadcasting the e-ticket and an associated answer set in a second answer set, upon receipt of the broadcast; and
   e) rejecting the e-ticket if the answer set is a subset of the second answer set, wherein steps a) through e) are performed to evaluate the e-ticket.

6. The method of claim 1 wherein the e-ticket represents a prior reservation of goods or services.

7. The method of claim 1 wherein the e-ticket contains no information specifically identifying the owner.

8. The method of claim 1 wherein broadcasts are performed in accordance with a selected one of a pure atomic broadcast, a general broadcast, a CT-broadcast, and an OPT-broadcast protocol.

9. A method of evaluating an e-ticket, comprising the steps of:
   a) sending the e-ticket from an initial receiving server $S_i$ to a plurality of servers including $S_i$, wherein each server returns an answer indicative of whether that server previously answered any inquiry for the e-ticket;
   b) selecting a conflict mode if at least one selected server of a majority of servers answered a previous inquiry for the e-ticket; and
   c) selecting a conflict-free mode if none of the majority of servers has answered any previous inquiry for the e-ticket, wherein steps a), b), and c) are performed to validate the e-ticket and wherein step b) further comprises the steps of:
      i) broadcasting the e-ticket and the answer set to the plurality of servers;
      ii) collecting the identity of any server $S_k$ broadcasting the e-ticket and an associated answer set in a second answer set; and
      iii) rejecting the e-ticket if the answer set is a subset of the second answer set.

10. The method of claim 9 wherein step c) further comprises the step of:
   i) accepting the e-ticket.

11. The method of claim 9 further comprising the step of:
   d) collecting the identities of the answering servers in an answer set.

12. The method of claim 9 further comprising the step of accepting the e-ticket if $S_i$ receives its own broadcast and the answer set $\subseteq$ the second answer set.

13. The method of claim 9 further comprising the step of rejecting the e-ticket if $S_i$ has received its own broadcast and the answer set is not a subset of the second answer set.

14. The method of claim 9 further comprising the step of:
   d) rejecting the e-ticket if the answer set $\subseteq$ the second answer set and $S_i$ has not received its own broadcast.

15. The method of claim 9 wherein the e-ticket represents a prior reservation of goods or services.

16. The method of claim 9 wherein broadcasts are performed in accordance with a selected one of a pure atomic broadcast, a general broadcast, a CT-broadcast, and an OPT-broadcast protocol.

* * * * *

UNITED STATES PATENT AND TRADEMARK OFFICE
CERTIFICATE OF CORRECTION

PATENT NO. : 7,231,368 B2 Page 1 of 1
APPLICATION NO. : 09/839664
DATED : June 12, 2007
INVENTOR(S) : Fernando Pedone It is certified that error appears in the above-identified patent and that said Letters Patent is hereby corrected as shown below:

In column 9, line 11, delete " $REPLIES_i^{\tau_j}$ " and insert -- $REPLIES_k^{\tau_j}$ --, therefor.

Signed and Sealed this

Nineteenth Day of May, 2009

JOHN DOLL
*Acting Director of the United States Patent and Trademark Office*